United States Patent
Tsuda et al.

(10) Patent No.: US 10,951,416 B2
(45) Date of Patent: Mar. 16, 2021

(54) MAP INFORMATION MANAGEMENT SYSTEM, MAP INFORMATION MANAGEMENT DEVICE, AND MAP COMPANY EXCLUSIVE APPLICATION DATA MANAGEMENT DEVICE

(71) Applicant: Mitsubishi Electric Corporation, Chiyoda-ku (JP)

(72) Inventors: Yoshiaki Tsuda, Tokyo (JP); Tsuneo Sato, Tokyo (JP); Toshiki Kawase, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 361 days.

(21) Appl. No.: 15/750,563

(22) PCT Filed: Aug. 31, 2016

(86) PCT No.: PCT/JP2016/075544
§ 371 (c)(1),
(2) Date: Feb. 6, 2018

(87) PCT Pub. No.: WO2017/038888
PCT Pub. Date: Mar. 9, 2017

(65) Prior Publication Data
US 2019/0028279 A1 Jan. 24, 2019

(30) Foreign Application Priority Data
Aug. 31, 2015 (JP) .............................. JP2015-170472

(51) Int. Cl.
*H04L 9/32* (2006.01)
*H04L 9/14* (2006.01)
(Continued)

(52) U.S. Cl.
CPC .......... *H04L 9/3247* (2013.01); *G01C 21/367* (2013.01); *G06F 16/29* (2019.01);
(Continued)

(58) Field of Classification Search
CPC ......... H04L 9/3247; H04L 9/008; H04L 9/08; H04L 9/0861; H04L 9/14; H04L 9/32; G06F 16/29; G01C 21/367
See application file for complete search history.

(56) References Cited

U.S. PATENT DOCUMENTS 8,261,083 B2 * 9/2012 Nakamura ............. G01C 21/32
713/176
8,892,522 B2 * 11/2014 Sugimoto .............. G09B 29/10
707/661
(Continued)

FOREIGN PATENT DOCUMENTS

JP 2003-318884 A 11/2003
JP 2005-250564 A 9/2005
(Continued)

OTHER PUBLICATIONS

Zeng et al., Navigation Map Update Framework under Beidou RDSS Mechanism, Jun. 2013, 21st International Conference on Geoinformatics, pp. 1-5 (Year: 2013).*
(Continued)

*Primary Examiner* — Kenneth W Chang
(74) *Attorney, Agent, or Firm* — Oblon, McClelland, Maier & Neustadt, L.L.P.

(57) ABSTRACT

A map information management system includes a map company exclusive application data management device that confirms data authenticity from encrypted data obtained from a dynamic map data management device and generates encrypted data from added map company exclusive application data to dynamic map data by a map company exclu-
(Continued)

sive secret key, and an automotive data management device that obtains added map company exclusive application data to dynamic map data from the map company exclusive application data management device, confirms data authenticity that is added map company exclusive application data to dynamic map data with using a map company exclusive application data public key, and generates encrypted data from data with automotive company exclusive application data by an automotive company exclusive application data secret key. When providing map information via plural organizations, the map information management system prevents data alteration and confirms data authenticity of the map information.

13 Claims, 5 Drawing Sheets

(51) Int. Cl.
  *H04L 9/08* (2006.01)
  *H04L 9/00* (2006.01)
  *G06F 16/29* (2019.01)
  *G01C 21/36* (2006.01)

(52) U.S. Cl.
  CPC ............... *H04L 9/008* (2013.01); *H04L 9/08* (2013.01); *H04L 9/0861* (2013.01); *H04L 9/14* (2013.01); *H04L 9/32* (2013.01)

(56) References Cited

U.S. PATENT DOCUMENTS

| | | | | |
|---|---|---|---|---|
| 2003/0084313 A1* | 5/2003 | Tada | ................... | G06F 21/10 713/193 |
| 2004/0193364 A1* | 9/2004 | Chojnacki | ................... | G01C 21/32 726/30 |
| 2007/0233385 A1* | 10/2007 | Dicke | ................... | G06F 16/29 715/864 |
| 2008/0046274 A1* | 2/2008 | Geelen | ................... | G01C 21/32 717/176 |
| 2008/0082225 A1* | 4/2008 | Barrett | ................... | G01C 21/32 701/26 |
| 2009/0228194 A1* | 9/2009 | Imasaka | ................... | G01C 21/32 701/532 |
| 2010/0070772 A1 | 3/2010 | Nakamura et al. | | |
| 2012/0291134 A1 | 11/2012 | Masuda et al. | | |
| 2013/0339722 A1* | 12/2013 | Krendelev | ................... | H04L 9/0637 713/150 |
| 2014/0185794 A1 | 7/2014 | Yasuda et al. | | |

FOREIGN PATENT DOCUMENTS

| | | |
|---|---|---|
| JP | 2008-175648 A | 7/2008 |
| JP | 2009-265277 A | 11/2009 |
| JP | 2014-126865 A | 7/2014 |
| JP | 5536313 B2 | 7/2014 |

OTHER PUBLICATIONS

International Search Report dated Sep. 27, 2016 in PCT/JP2016/075544 filed Aug. 31, 2016.

"Service Using Three Dimensional Location Information and Common Infrastructure Maintenance", Council on Competitiveness—Nippon, Final Report of Project in Fiscal year 2014, Mar. 5, 2015, 55 total pages (with partial English translation).

"Modeling of Driving Environment / Dynamic Map", Nissan Motor Co., Ltd., Jan. 29, 2015, SIP-adus, Shirato Ryota, 13 total pages (with partial English translation).

European Office Action Report dated Feb. 4, 2020 in Patent Application No. 16 841 918.2, 6 pages.

Office Action dated Oct. 1, 2020 in corresponding European Patent Application No. 16 841 918.2; 6 pages.

Office Action dated Sep. 18, 2018 in Japanese Patent Application No. 2017-538080, (with English translation), 8 pages.

Extended European Search Report dated Mar. 6, 2019 in Patent Application No. 16841918.2, 8 pages.

Office Action dated Nov. 27, 2020 in Chinese Application No. 201680048677.X (w/computer-generated English translation).

\* cited by examiner

MAP INFORMATION MANAGEMENT SYSTEM, MAP INFORMATION MANAGEMENT DEVICE, AND MAP COMPANY EXCLUSIVE APPLICATION DATA MANAGEMENT DEVICE

TECHNICAL FIELD

The present invention relates to a map information management system managing map information.

BACKGROUND ART

With spread of satellite position technology, new industries such as automatic driving using three-dimensional positioning information and road pricing are considered. In an automatic driving system, research and development of advanced technology of map information (a dynamic map) are conducted. The dynamic map is configured by linking each layer information including information such as dynamic information (such as surrounding vehicles, pedestrian information, traffic light information), quasi-dynamic information (such as traffic accident information, traffic jam information, narrow area weather information), quasi-static information (such as traffic regulation information, road construction information, wide area weather information) and static information (such as road surface information, traffic lane information, three-dimensional building information). And a maintenance of common infrastructure using the three-dimensional positioning information including the dynamic map is promoted (for instance, refer to Non-Patent Literature 1, Non-Patent Literature 2).

An automatic driving vehicle is mounted with the dynamic map including an automatic driving map data for a navigation use. Additionally, the automatic driving vehicle is mounted with a large number of autonomous sensors such as cameras and radars to observe surrounding environment of the own vehicle and detect presence or absence of obstacles such as the other vehicles, people and buildings around the own vehicle.

The automatic driving vehicle recognizes current self-location by a map matching of self-location information obtained from a vehicle speed pulse (running speed), a yaw rate (azimuth angular speed) and a received GPS positioning signal of the own vehicle and the automatic driving map data. The automatic driving vehicle predicts future self-location information from the current self-location information (coordinates), the running speed, the azimuth angular speed and the like of the own vehicle. An automatic driving is conducted by adjusting a driving force, a steering angle, a braking force and the like of the own vehicle by an autonomous control with using sensor information by an autonomous sensor mounted on the own vehicle and the self-location information.

In dynamic map including automatic driving map data mounted on the automatic driving vehicle, an accuracy of the road map needs a high precision map accuracy (for instance, 1/500 scale) rather than a map accuracy of general map data used for a conventional car navigation (for instance, 1/2500 scale).

Further, by using information on the surrounding road conditions collected by the autonomous sensors and the dynamic map including the automatic driving map data in conjunction with each other, the automatic driving vehicle can determine stops, starts and the like at predetermined positions on the automatic driving map, while checking sequentially its own locations on the automatic driving map.

For instance, at a certain intersection on the automatic driving map data, the automatic driving vehicle receives current traffic light information of the traffic light from a light beacon, radio beacons such as a 700 MHz band side radio device, a 5.8 GHz band side radio device, and the like. The automatic driving vehicle can recognize a distance from the current self-location to the intersection which the automatic driving vehicle will pass by, a stop line position, the current signal information and the like, and determine stops of the vehicle including temporary stops at intersections, the vehicle start timings, intersection passing speed and the like (For instance, refer to Patent Literature 1).

With respect to the dynamic map including the automatic driving map data mounted on the automatic driving vehicle or a car navigation device, fundamental dynamic map data is generated by a map generating device of a map information management system, data-provided to a map company or an automotive company via a data output device and stored in the car navigation device mounted on the automatic driving vehicle. Map data used in a conventional car navigation device is distributed to car navigation devices from an information distribution center of the map company, an automotive company or the like via network lines such as a mobile phone, a public line and an automotive company exclusive line, and data update is conducted. For preventing data alteration at the time of information distribution and for ensuring a validity of map data, information security is ensured by an encryption technique using a secret key, a public key and the like (for instance, Patent Literature 2).

CITATION LIST

Non-Patent Literature

Non-Patent Literature 1: Council on Competitiveness-Nippon, Final Report of Project in Fiscal year 2014 "Service Using Three Dimensional Location Information and Common Infrastructure Maintenance", Council on Competitiveness-Nippon Non-Patent Literature 2: Modeling of Driving Environment/Dynamic Map, Nissan Motor Co., Ltd., SHIRATO Ryota, 29 Jan. 2015, SIP-adushttp://www8.cao.go.jp/cstp/gaiyo/sip/iinkai/jidousoukou_media/2kai/shiryo4.pdf

Patent Literature

Patent Literature 1: JP 2005-250564 A
Patent Literature 2: JP 2008-175648 A

SUMMARY OF INVENTION

Technical Problem

When a map generating device data-provides dynamic map to a map company and an automotive company, it is necessary to ensure information security in data transfer between different companies. For instance, a map company which has received dynamic map adds application data exclusively for a map company (hereafter, map company exclusive application data) to the dynamic map. The map company data-delivers and provides the dynamic map to which the map company exclusive application data is added to an automotive company. The automotive company adds application data exclusively for an automotive company (hereafter, automotive company exclusive application data) such as automatic driving map data to the dynamic map data-provided from the map generating device of the map company or the dynamic map with the map company exclusive application data and implements the data in a memory device of an automatic driving car navigation device.

The automotive company that has received data including the dynamic map is needed to prevent data alternation of the data by an illegal access and an illegal operation from the outside when incorporating the data into its own automatic driving vehicle or its own car navigation device. For instance, the automotive company needs to prevent data alternation when providing automatic driving vehicles or navigation devices to other automotive companies via OEM (Original Equipment Manufacturer) provisions.

Also, when receiving data including dynamic map data and when implementing the data in the automatic driving vehicles or the navigation devices, authenticity certification scheme to confirm that a generator of the data is not an unauthorized one is necessary.

However, a conventional map information management system does not employ any measures to prevent alternation of data at a time of data-providing the dynamic map via a plurality of companies (a plurality of organizations) such as the automotive company or the map company and transferring the data. Moreover, the conventional map information management system does not employ any scheme to confirm the authenticity of the provided data at a time when implementing the data in automotives or car navigation devices.

The present invention is made for solving the above-mentioned problem. The present invention aims to obtain a mapping information management system which prevents data alternation of dynamic map data including car company exclusive application data such as automatic driving map information and confirms data authenticity of the dynamic map data including the car company exclusive application data such as the automatic driving map data at a time when the dynamic map data is provided via a plurality of organizations, the dynamic map data including the car company exclusive application data such as the automatic driving map information.

Solution to Problem

A map information management system according to the present invention includes:
a dynamic map data management device to generate encrypted data based on pre-generated dynamic map data being map information, using a dynamic map data secret key, and output;
map company exclusive application data management device to obtain the encrypted data from the dynamic map data management device, confirm authenticity of the dynamic map data, using a pre-received dynamic map data public key corresponding to the dynamic map data secret key and the encrypted data obtained from the dynamic map data management device, generate encrypted data by a pre-received map company exclusive application data secret key, based on data which is obtained by adding map company exclusive application data to the dynamic map data which has been confirmed to be authentic, and output the data which is obtained by adding the map company exclusive application data to the dynamic map data which has been confirmed to be authentic; and
an automotive data management device to obtain the data which is obtained by adding the map company exclusive application data to the dynamic map data from the map company exclusive application data management device, confirm authenticity of the data which is obtained by adding the map company exclusive application data to the dynamic map data, using a pre-received map company exclusive application data public key corresponding to the map company exclusive application data secret key and the encrypted data, and generate encrypted data to be implemented in a vehicle, by a pre-received automotive company exclusive application data secret key, based on data which is further obtained by adding automotive company exclusive application data to the data which is obtained by adding the map company exclusive application data to the dynamic map data which has been confirmed to be authentic.

Advantageous Effects of Invention

According to the present invention, it is possible to obtain a map information system which prevents data alternations of map information and confirm data authenticity of the map information at the time when the map information is provided via a plurality of organizations.

EMBODIMENT 1

Figure 1:
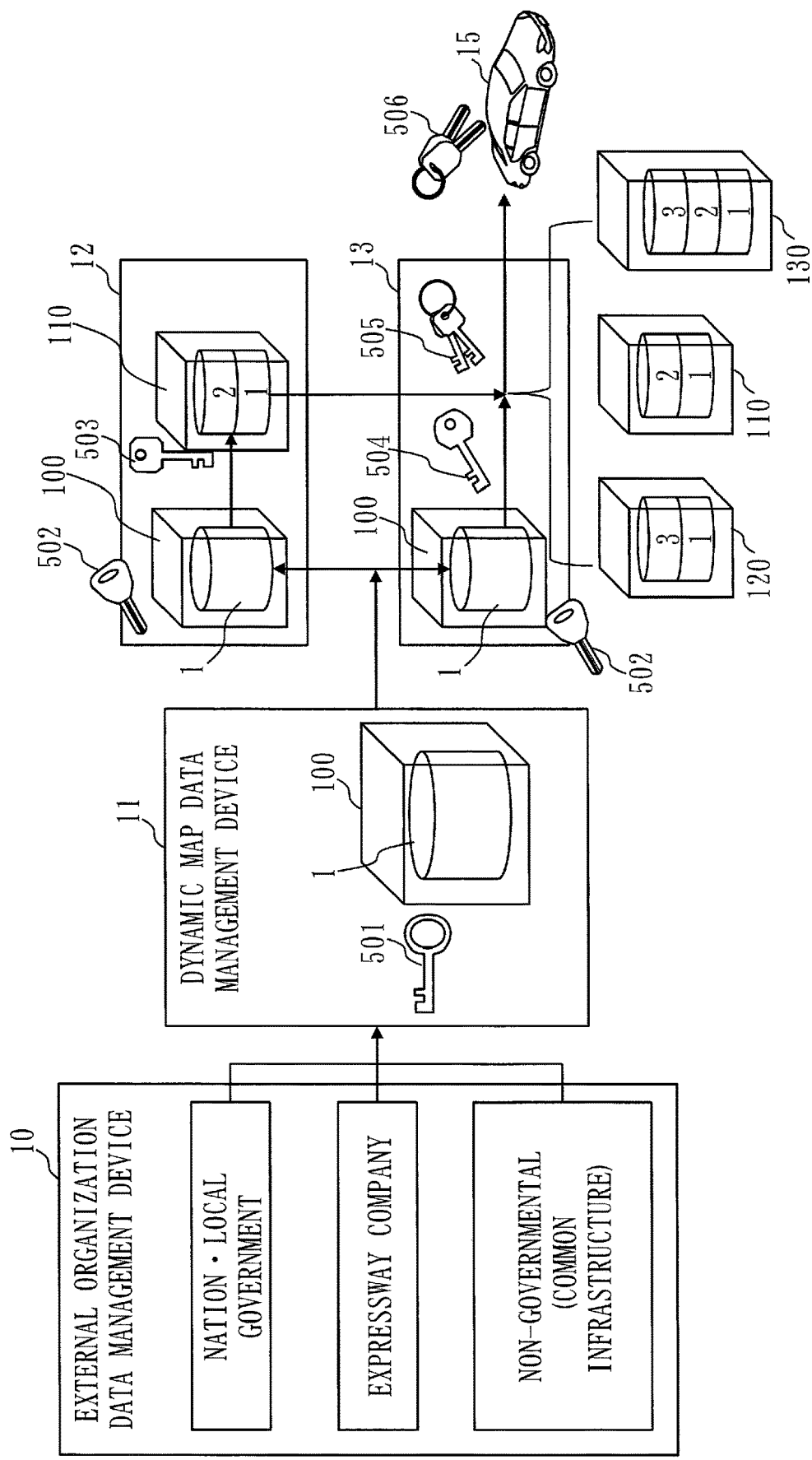
FIG. 1 is a diagram illustrating a configuration of a map information management system according to Embodiment 1.

FIG. 1 illustrates a configuration of a map information management system according to Embodiment 1 of the present invention. In FIG. 1, the map information management system includes a dynamic map data management device 11, a map company exclusive application data management device 12, and an automotive company exclusive application data management device 13. The dynamic map data management device 11 is a common infrastructure to manage basic map information. The map company exclusive application data management device 12 is operated and managed by, for instance, a map company. The automotive company exclusive application data management device 13 is operated and managed by, for instance, an automotive company. An external organization data management device 10 is a device providing original data which is used when the dynamic map data is generated by the dynamic map data management device 11. The dynamic map data management device 11 receives various sorts of information as the original data for generating the dynamic map, from the external organization data management device 10. A vehicle 15 is an automatic driving vehicle or a vehicle on which a car navigation device is mounted.

The external organization data management device 10 includes one or a plurality of servers, and stores various sorts of information each of which is possessed by a nation, local governments, road utilities such as expressway companies, road traffic information communication system centers, non-governmental organizations (common infrastructure maintenance organizations) such as Japan Traffic Information Center, and the like. The various sorts of information as the original data for generating the dynamic map include traffic management information such as traffic light displays and traffic regulations, traffic condition information such as vehicles and pedestrians, traffic road environmental information such as pavement sign displays, road signs and surrounding constructions, detailed road management information such as weather information, road shapes, road surface conditions, traffic construction points, and the like. Traffic road environmental information includes two-dimensional road linear information, three-dimensional point group information which discretely represents three-dimensional positioning coordinates of a road surface or a surface shape of surrounding objects on a road, and the like.

At this point, the three-dimensional point group information includes high accuracy three-dimensional position information in sub meter or centimeter order measured by, for instance, MMS (Mobile Map System; high accuracy GPS movement measurement device). Using a vehicle high accuracy position and a position control, and a high accuracy laser radar and a high accuracy camera, MMS measures three-dimensional positioning information of the roads and the surrounding objects by overlapping camera image data and laser point group data. The three-dimensional positioning accuracy of the laser point group obtained by MMS is regarded that an absolute accuracy of latitude, longitude and height is 10 cm, for instance. By using a high accurate positioning receiver available for quasi-zenith satellite positioning service, the MMS is capable of conducting a high accurate positioning by GNSS signals such as GPS signal and positioning reinforcement signals delivered from the quasi-zenith satellite.

The dynamic map data management device 11 generates dynamic map data 1 which is an original drawing of map information based on the various sorts of information mentioned above from the external organization data management device 10. The dynamic map data management device 11 generates encrypted data 100 which is encrypted dynamic map data 1 generated that is mentioned above by using a dynamic map data secret key 501, outputs the encrypted data 100 to each of the map company exclusive application data management device 12 and the automotive company exclusive application data management device 13.

The map company exclusive application data management device 12 pre-receives a dynamic map data public key 502 corresponding to the dynamic map data secret key 501 and confirms an authenticity of the encrypted data 100 from the dynamic map data management device 11. The map company exclusive application data management device 12 adds the map company exclusive application data 2 as map information to the dynamic map data 1 included in the encrypted data 100 whose authenticity has been confirmed. Then, the map company exclusive application data management device 12 generates an encrypted data 110 by a map company exclusive application data secret key 503. The map company exclusive application data management device 12 outputs the encrypted data 110 to the automotive company exclusive application data management device 13.

The automotive company exclusive application data management device 13 pre-receives the dynamic map data public key 502 corresponding to the dynamic map data secret key 501 and confirms the authenticity of the encrypted data 100 from the dynamic map data management device 11. The automotive company exclusive application data management device 13 adds the automotive company exclusive application data 3 as map information to the dynamic map data 1 that is owned by the encrypted data 100 whose authenticity has been confirmed, and generates encrypted data 120 by an automotive company exclusive application data secret key 505. The automotive company exclusive application data management device 13 implements the encrypted data 120 and the encrypted data 110 on the vehicle 15. The vehicle 15 pre-receives an automotive company exclusive application data public key 506 corresponding to the automotive company exclusive application data secret key 505, and confirms the authenticity of the encrypted data 120 and the encrypted data 110.

Also, the automotive company exclusive application data management device 13 pre-receives a map company exclusive application data public key 504 corresponding to the map company exclusive application data secret key 503 and confirms an authenticity of the encrypted data 110 from the map company exclusive application data management device 12. The automotive company exclusive application data management device 13 adds the automotive company exclusive application data 3 as map information to the dynamic map data 1 and the map company exclusive application data 2 which are owned by the encrypted data 110 whose authenticity has been confirmed, and generates encrypted data 130 by the automotive company exclusive application data secret key 505. The automotive company exclusive application data management device 13 implements the encrypted data 130 on the vehicle 15. The vehicle 15 pre-receives the automotive company exclusive application data public key 506 corresponding to the automotive company exclusive application data secret key 505, and confirms the authenticity of the encrypted data 130. The automotive company exclusive application data 3 is, for instance, map data for automatic driving.

In this manner, in the map information management system according to Embodiment 1, data is provided to the vehicle 15 and the like, while each data of the dynamic map data 1, the map company exclusive application data 2 and the automotive company exclusive application data 3 is kept encrypted, using a public key encryption multiplexing method where data that passes through each of the dynamic map data management device 11, the map company exclusive application data management device 12, and the automotive company exclusive application data management device 13 is subsequently encrypted stepwisely.

Figure 2:
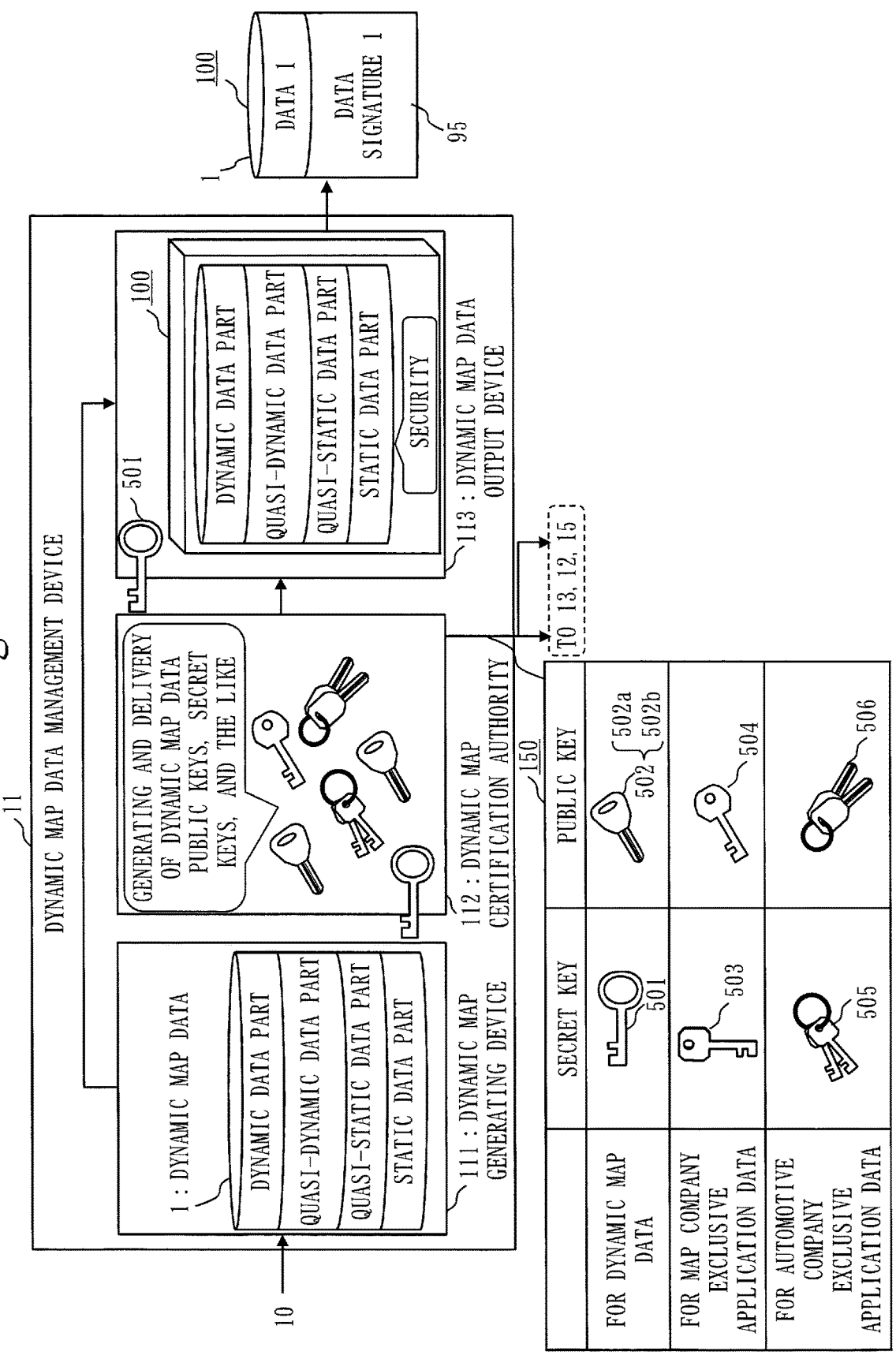
FIG. 2 is a diagram illustrating a configuration of dynamic map data management device of the map information management system according to Embodiment 1.

FIG. 2 illustrates a configuration of the dynamic map data management device 11 of the map information management system according to Embodiment 1. In FIG. 2, the dynamic map data management device 11 includes a dynamic map generating device 111, a dynamic map certification authority 112, and a dynamic map data output device 113. The dynamic map generating device 111 and the dynamic map data output device 113 may be composed of the same server or different servers connected to a network. Also, the dynamic map certification authority 112 is installed in a server set outside of a server which includes the dynamic map generating device 111 or the dynamic map data output device 113 in the dynamic map data management device 11. Hence, in order to secure strength of security, the dynamic map certification authority 112 is preferably operated and managed separately from the dynamic map generating device 111 and the dynamic map data output device 113.

The dynamic map generating device 111 receives various sorts of information as the original data being used when the dynamic map is generated, from the external organization data management device 10. The dynamic map generating device 111 is a map generating device generating the dynamic map data 1 based on the various sorts of information as the original data being used when the dynamic map is generated, obtained from the external organization data management device 10.

The dynamic map certification authority 112 generates a plurality of secret keys and a plurality of public keys 150, stores managers, users and renewal dates and time of the generated secret keys and public keys, and conducts renewal managements.

For instance, the dynamic map certification authority 112 generates each of the dynamic map data secret key 501 and the dynamic map data public key 502 (502a, 502b) for a signature verification of an electronic signature by the dynamic map data secret key 501, the map company exclusive application data secret key 503 and the map company exclusive application data public key 504 for a signature verification of an electronic signature by the map company exclusive application data secret key 503, and the automotive company exclusive application data secret key 505 and the automotive company exclusive application data public key 506 for a signature verification of an electronic signature by the automotive company exclusive application data secret key 505, as the plurality of secret keys and the plurality of public keys 150.

The dynamic map certification authority 112 delivers each of the plurality of secret keys generated and the plurality of public keys 150 generated to a corresponding and appropriate destination among the map company exclusive application data management device 12, the automotive company exclusive application data management device 13, and the vehicle 15 using an encrypted communication via a communication network, while a security is being maintained.

For instance, the dynamic map data public key 502 is delivered to each of the map company exclusive application data management device 12 and the automotive company exclusive application data management device 13. The map company exclusive application data secret key 503 is solely delivered to the map company exclusive application data management device 12. The map company exclusive application data public key 504 is delivered to the automotive company exclusive application data management device 13. The automotive company exclusive application data secret key 505 is solely delivered to the automotive company exclusive application data management device 13. The automotive company exclusive application data public key 506 is delivered to the automotive company exclusive application data management device 13 and the vehicle 15.

Here, it is possible to treat the dynamic map data public key 502 that the map company exclusive application data management device 12 receives as a dynamic map data public key 502a, and treat the dynamic map data public key 502 that the automotive company exclusive application data management device 13 receives as a dynamic map data public key 502b, so as to have a different access right, a different decrypting right, a different data processing right and the like between the keys.

Further, the dynamic map certification authority 112 may encrypt the plurality of secret keys and the plurality of public keys 150 and store them in electronic mediums such as a DVD-ROM, a BD-ROM or a USB memory. The electronic mediums such as the DVD-ROM, the BD-ROM or the USB memory are preferably delivered to each of the map company exclusive application data management device 12 and the automotive company exclusive application data management device 13.

The dynamic map data output device 113 generates a dynamic map data electronic signature 95 which is encrypted data (data signature 1) for conducting an authenticity certification of the dynamic map data, using the dynamic map data secret key 501, generated based on the dynamic map data 1 in a predetermined unit (a predetermined length of bit array or a variable length of bit array) generated by the dynamic map generating device 111. For instance, the dynamic map data output device 113 outputs the dynamic map data electronic signature 95 by inputting the dynamic map data 1 and the dynamic map data secret key 501 into a signature generating algorithm.

Also, the dynamic map data output device 113 adds to the generated dynamic map data 1 in the predetermined unit the dynamic map data electronic signature 95 corresponding to the dynamic map data 1, and generates the encrypted data 100 which is packetized data obtained by combining the dynamic map data 1 and the dynamic map data electronic signature 95. The encrypted data 100 here may be a plain text in which the contents of the dynamic map data 1 and the dynamic map data electronic signature 95 can be browsed, and is referred to as encrypted data in a meaning that a signature verification of the dynamic map data 1 can be carried out by using the dynamic map data electronic signature 95.

The dynamic map data output device 113 outputs the encrypted data 100 to each of the map company exclusive application data management device 12 and the automotive company exclusive application data management device 13.

The dynamic map data output device 113 may store the encrypted data 100 after an encryption in the electronic mediums such as a DVD-ROM, a BD-ROM, or a USB memory, and may deliver the electronic mediums such as the DVD-ROM, the BD-ROM, or the USB memory to each of the map company exclusive application data management device 12 and the automotive company exclusive application data management device 13.

Figure 3:
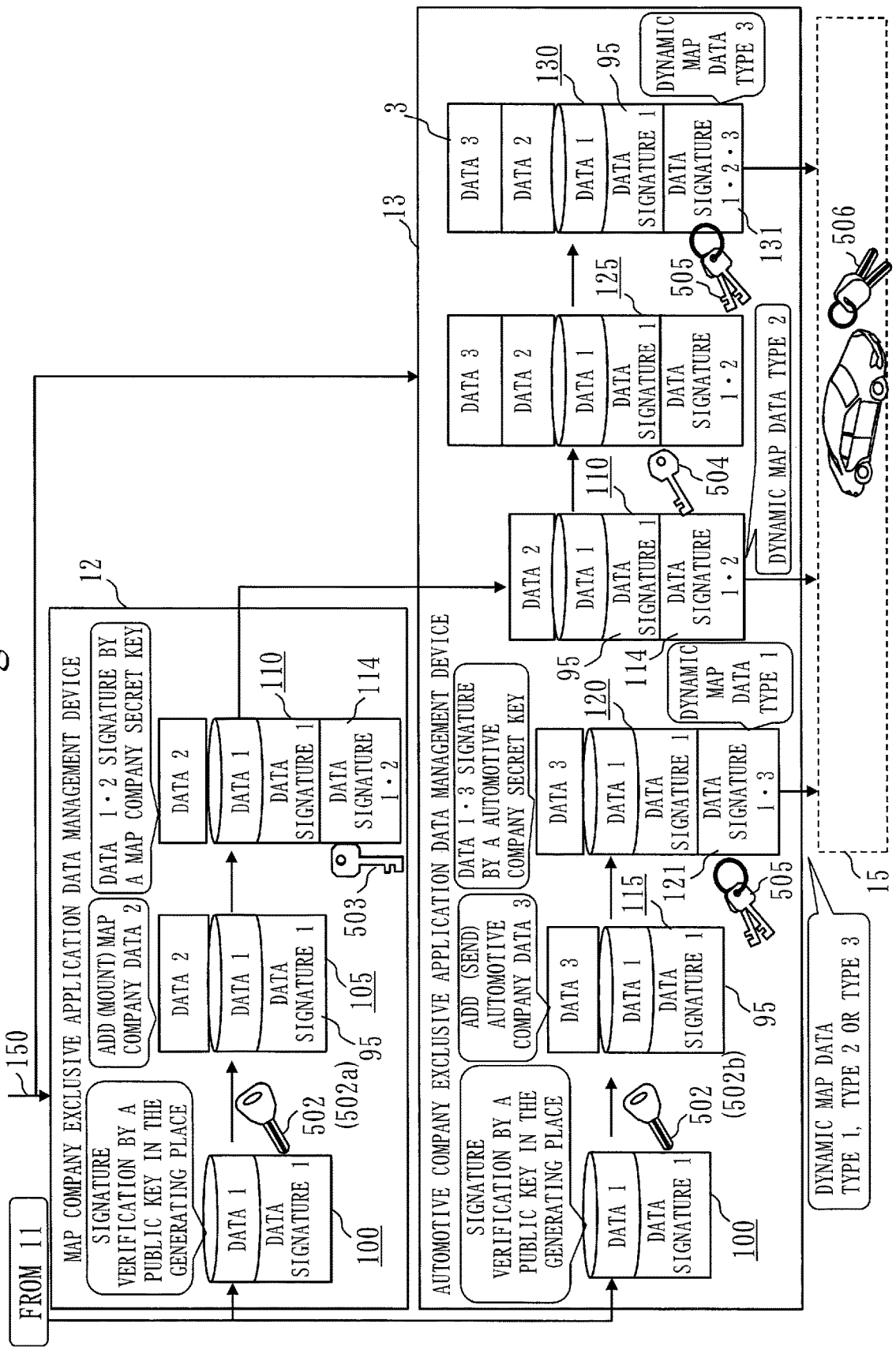
FIG. 3 is a flowchart illustrating a flow of a map company exclusive application data management device and an automotive company exclusive application data management device of the map information management system according to Embodiment 1.

FIG. 3 is a diagram illustrating a data processing flow by the map company exclusive application data management device 12 and the automotive company exclusive application data management device 13 in the map information management system according to Embodiment 1. In FIG. 3, the vehicle 15 is an automatic driving vehicle with a memory device, a car navigation device including a memory device and a map display device, or the like.

In FIG. 3, the map company exclusive application data management device 12 obtains the dynamic map data public key 502 (502a) and the map company exclusive application data secret key 503 from the dynamic map data management device 11 by the encrypted communication via the communication network. Further, the map company exclusive application data management device 12 receives the encrypted data 100 in which the dynamic map data 1 and the dynamic map data electronic signature 95 are combined, from the dynamic map data management device 11 by the encrypted communication via the communication network.

Note that the map company exclusive application data management device 12 and the automotive company exclusive application data management device 13 may receive the encrypted data 100 in a state that the encrypted data 100 is stored in the electronic mediums such as the DVD-ROM, the BD-ROM or the USB memory.

When acquiring the encrypted data 100, the map company exclusive application data management device 12 conducts the signature verification of the dynamic map data 1 using the dynamic map data public key 502 (502a) and the dynamic map data electronic signature 95, at the same time as the acquisition, at the predetermined time interval, or after a predetermined time period has lapsed. Then, the map company exclusive application data management device 12 confirms the authenticity of the dynamic map data 1 in the encrypted data 100. For instance, by inputting the dynamic map data 1, the dynamic map data electronic signature 95 and the dynamic map data public key 502 (502a) in the encrypted data 100 into the signature verification algorithm, the map company exclusive application data management device 12 inspects whether the dynamic map data 1 is a legitimate (authentic) one received directly or indirectly from a legitimate generator, and if it is legitimate, the map company exclusive application data management device 12 confirms that the dynamic map data 1 is authentic.

After conducting the authenticity certification by the above signature verification, the map company exclusive application data management device 12 adds the map company exclusive application data 2 to the dynamic map data 1 which is confirmed (guaranteed) to be authentic so as to generate combination data 105.

The map company exclusive application data 2 includes, for instance, information on shops, information on architectures such as buildings and residences, information on public facilities such as parks and libraries, information of commercial facilities such as amusement parks and shopping malls, around roads. The map company exclusive application data 2 is map company exclusive application data including information on names, addresses, telephone numbers, three-dimensional model shapes, exits and entrances of each of shops, architectures, and facilities.

Based on the dynamic map data electronic signature 95 and the dynamic map data 1 to which the map company exclusive application data 2 is added, the map company exclusive application data management device 12 generates a map company exclusive application data electronic signature 114 using the map company exclusive application data secret key 503. The map company exclusive application data electronic signature 114 is encrypted data (data signature 1•2) for conducting the authenticity certification of the dynamic map data electronic signature 95 and the dynamic map data 1 to which the map company exclusive application data 2 is added. For instance, the map company exclusive application data management device 12 outputs the map company exclusive application data electronic signature 114 by inputting the dynamic map data 1, the dynamic map data electronic signature 95 and the map company exclusive application data secret key 503 into the signature generating algorithm.

The map company exclusive application data management device 12 generates the encrypted data 110 which is packetized data obtained by combining the dynamic map data 1, the map company exclusive application data 2, the dynamic map data electronic signature 95 and the map company exclusive application data electronic signature 114. The encrypted data 110 here may be a plain text in which the contents of the dynamic map data 1, the map company exclusive application data 2, the dynamic map data electronic signature 95 and the map company exclusive application data electronic signature 114 can be independently browsed, and is referred to as encrypted data in a meaning that signature verifications of the dynamic map data 1 and the map company exclusive application data 2 can be carried out by using the map company exclusive application data electronic signature 114.

The map company exclusive application data management device 12 outputs the encrypted data 110 to the automotive company exclusive application data management device 13.

In FIG. 3, the automotive company exclusive application data management device 13 obtains the dynamic map data public key 502 (502b) and the map company exclusive application data secret key 503 from the dynamic map data management device 11 by the encrypted communication via the communication network. Further, the automotive company exclusive application data management device 13 receives the encrypted data 100 in which the dynamic map data 1 and the dynamic map data electronic signature 95 are combined, from the dynamic map data management device 11 by the encrypted communication via the communication network.

Note that the map company exclusive application data management device 12 and the automotive company exclusive application data management device 13 may receive the encrypted data 100 in a state that the encrypted data 100 is stored in the electronic mediums such as the DVD-ROM, the BD-ROM or the USB memory.

When acquiring the encrypted data 100, the automotive company exclusive application data management device 13 conducts the signature verification of the dynamic map data 1 using the dynamic map data public key 502 (502b) and the dynamic map data electronic signature 95 to confirm the authenticity of the dynamic map data 1 in the encrypted data 100, at predetermined time.

After conducting the authenticity certification of the dynamic map data 1 by the above signature verification, the automotive company exclusive application data management device 13 adds the automotive company exclusive application data 3 to the dynamic map data 1 which is confirmed (guaranteed) to be authentic so as to generate combination data 115.

The automotive company exclusive application data 3 is information on vicinities of road used by vehicles. For instance, the automotive company exclusive application data 3 is automotive company exclusive application data including a point where a vehicle should decelerate before entering a curve on the road and an entry speed at that point, a point where a right turning vehicle should decelerate and an entry speed at the point on a right turning traffic lane of a road, a position and details of traffic lights and road signs, puddles on a road, the presence or the absence of freezing or piled-up snow, a traffic jam condition of a road, a road construction area, and the like.

Based on the dynamic map data electronic signature 95 and the combination data 115 of the dynamic map data 1 to which the automotive company exclusive application data 3 is added, the automotive company exclusive application data management device 13 generates an automotive company exclusive application data electronic signature 121 using the automotive company exclusive application data secret key 505. The automotive company exclusive application data electronic signature 121 is encrypted data (data signature 1•3) for conducting the authenticity certifications of the dynamic map data electronic signature 95 and the dynamic map data 1 to Which the automotive company exclusive application data 3 is added. The automotive company exclusive application data management device 13 generates the encrypted data 120 which is packetized data obtained by combining the dynamic map data 1, the automotive company exclusive application data 3, the dynamic map data electronic signature 95 and the automotive company exclusive application data electronic signature 121. The encrypted data 120 here may be a plain text in which the contents of the dynamic map data 1, the automotive company exclusive application data 3, the dynamic map data electronic signature 95 and the automotive company exclusive application data electronic signature 121 can be independently browsed, and is referred to as encrypted data in a meaning that signature verifications of the dynamic map data 1 and the automotive company exclusive application data 3 can be carried out by using the automotive company exclusive application data electronic signature 121.

The automotive company exclusive application data management device 13 delivers the encrypted data 120 to the memory device of the vehicle 15 using the encrypted communication via the communication network.

The automotive company exclusive application data management device 13 may store the encrypted data 120 after the encryption in the electronic mediums such as a DVD-ROM, a BD-ROM or a USB memory, and may data-store in the electronic mediums such as the DVD-ROM, the BD-ROM or the USB memory in the memory device of the vehicle 15 or the car navigation device via the electronic medium reading device of the vehicle 15 or the car navigation device (for instance, a DVD reader).

Also, in FIG. 3, the automotive company exclusive application data management device 13 obtains the map company exclusive application data public key 504 and the automotive company exclusive application data secret key 505 from the dynamic map data management device 11 by the encrypted communication via the communication network. Further, the automotive company exclusive application data management device 13 receives the encrypted data 110 in which the dynamic map data 1, the map company exclusive application data 2, the dynamic map data electronic signature 95 and the map company exclusive application data electronic signature 114 are combined, from the map company exclusive application data management device 12 by the encrypted communication via the communication network.

Note that the automotive company exclusive application data management device 13 may receive the encrypted data 110 in a state that the encrypted data 110 is stored in the electronic mediums such as the DVD-ROM, the BD-ROM or the USB memory.

When acquiring the encrypted data 110, the automotive company exclusive application data management device 13 conducts the signature verifications of the dynamic map data 1 and the map company exclusive application data 2 using the map company exclusive application data public key 504 to confirm the authenticity of the dynamic map data 1 and the map company exclusive application data 2 in the encrypted data 110, at predetermined time.

After conducting the authenticity certification by the above signature verification, the automotive company exclusive application data management device 13 adds the automotive company exclusive application data 3 to the dynamic map data 1 and the map company exclusive application data 2 which are confirmed to be authentic so as to generate combination data 125.

Based on the combination data 125 of the dynamic map data 1 and the map company exclusive application data 2, the dynamic map data electronic signature 95 and the map company exclusive application data electronic signature 114 to which the automotive company exclusive application data 3 is added, the automotive company exclusive application data management device 13 generates an automotive company exclusive application data electronic signature 131 using the automotive company exclusive application data secret key 505. The automotive company exclusive application data electronic signature 131 is encrypted data (data signature 1•2•3) for conducting the authenticity certifications of the map company exclusive application data 2, the dynamic map data electronic signature 95, the map company exclusive application data electronic signature 114, and the dynamic map data 1 to which the automotive company exclusive application data 3 is added.

The automotive company exclusive application data management device 13 generates the encrypted data 130 which is packetized data obtained by combining the dynamic map data 1, the map company exclusive application data 2, the automotive company exclusive application data 3, the dynamic map data electronic signature 95, the map company exclusive application data electronic signature 114 and the automotive company exclusive application data electronic signature 131. The encrypted data 130 here may be a plain text in which the contents of the dynamic map data 1, the map company exclusive application data 2, the automotive company exclusive application data 3, the dynamic map data electronic signature 95, the map company exclusive application data electronic signature 114 and the automotive company exclusive application data electronic signature 131 can be independently browsed, and is referred to as encrypted data in a meaning that signature verifications of the dynamic map data 1, the map company exclusive application data 2 and the automotive company exclusive application data 3 can be carried out by using the automotive company exclusive application data electronic signature 131.

In the encrypted data 130, the map company exclusive application data electronic signature 114 may be omitted because an authenticity certification of the map company exclusive application data 2 can be conducted with the automotive company exclusive application data electronic signature 131. That is, the automotive company exclusive application data management device 13 may generate the encrypted data 130 which is packetized data in which the dynamic map data 1, the map company exclusive application data 2, the automotive company exclusive application data 3, the dynamic map data electronic signature 95 and the automotive company exclusive application data electronic signature 131 are combined.

The automotive company exclusive data management device 13 delivers the encrypted data 110, the encrypted data 120 and the encrypted data 130 to the memory device of the vehicle 15 or the car navigation device by the encrypted communication via the communication network. After receiving the encrypted data 110, the encrypted data 120 and the encrypted data 130, the vehicle 15 conducts a signature verification on each of the dynamic map data 1, the map company exclusive application data 2 and the automotive company exclusive application data 3 using the pre-received automotive company exclusive application data public key 506 received beforehand from the dynamic map certification authority 112 of the dynamic map data management device 11 and confirms the authenticity of each data.

The automotive company exclusive application data management device 13 may store the encrypted data 110, the encrypted data 120 and the encrypted data 130 after the encryptions in the electronic mediums such as a DVD-ROM, a BD-ROM or a USB memory, and may data-store in the electronic mediums such as the DVD-ROM, the BD-ROM or the USB memory in the memory device of the vehicle 15 or the car navigation device via the electronic medium reading device of the vehicle 15 or the car navigation device (for instance, a DVD reader).

In this manner, in the map information management system according to Embodiment 1, the dynamic map data management device 11 generates the dynamic map data 1, using data obtained from the external organization data management device 10. Then, the dynamic map data management device 11 provides data in such a way that the dynamic map data is accompanied by an electronic signature which has been generated by an encryption algorithm, when the dynamic map data 1 is delivered to a plurality of organizations such as a map company and an automotive company. Thereby, it is possible to prevent data alteration of the dynamic map. Further, it is possible to guarantee that the dynamic map data 1 received by a plurality of organizations such as the map company exclusive application data management device 12 of the map company and the automotive company exclusive application data management device 13 of the automotive company is data from a legitimate data generator or not (it is possible to confirm the authenticity).

As mentioned above, the map information management system according to Embodiment 1 includes a dynamic map data management device 11 which generates encrypted data 100 in which a dynamic map data electronic signature 95 which is encrypted data based on pre-generated dynamic map data 1 is added to the dynamic map data 1, using a dynamic map data secret key 501, and outputs, a map company exclusive application data management device 12 which obtains the encrypted data 100 from the dynamic map data management device 11, confirms authenticity of the dynamic map data 1, using a pre-received dynamic map data public key 502 corresponding to the dynamic map data secret key 501 and the encrypted data 100 obtained from the dynamic map data management device 11, generates a map company exclusive application data electronic signature 114 which is encrypted data by a pre-received map company exclusive application data secret key 503, based on data 105 which is obtained by adding map company exclusive application data 2 to the dynamic map data 1 which has been confirmed to be authentic, and outputs encrypted data 110 which is obtained by adding the map company exclusive application data 2 and the map company exclusive application data electronic signature 114 to the dynamic map data 1 which has been confirmed to be authentic, and an automotive company exclusive application data management device 13 which obtains the encrypted data 110 which is obtained by adding the map company exclusive application data 2 to the dynamic map data 1 from the map company exclusive application data management device 12, confirms authenticity of the encrypted data 110 which is obtained by adding the map company exclusive application data 2 to the dynamic map data 1, using a pre-received map company exclusive application data public key 504 corresponding to the map company exclusive application data secret key 503, and generates an automotive company exclusive application data electronic signature 131 which is encrypted data to be implemented in a vehicle, by a pre-received automotive company exclusive application data secret key 505, based on encrypted data 130 which is further obtained by adding automotive company exclusive application data 3 to the data which is obtained by adding the map company exclusive application data 2 to the dynamic map data 1 which has been confirmed to be authentic.

Furthermore, a dynamic map data management device 11 includes a dynamic map generating device 111 which generates the dynamic map data 1, a dynamic map certification authority 112 which generates each of a dynamic map data secret key 501 and a dynamic map data public key 502 (502a) for a signature verification of an electronic signature by the dynamic map data secret key 501, a map company exclusive application data secret key 503 and a map company exclusive application data public key 504 for a signature verification of an electronic signature by the map company exclusive application data secret key 503, and an automotive company exclusive application data secret key 505 and an automotive company exclusive application data public key 506 for a signature verification of an electronic signature by the automotive company exclusive application data secret key 505, and distributes each generated secret key and each generated public key, and a dynamic map data output device 113 which generates a dynamic map data electronic signature 95 for conducting an authenticity certification of the dynamic map data 1, using the generated dynamic map data secret key 501, based on the generated dynamic map data 1, and outputs the generated dynamic map data 1 and the dynamic map data electronic signature 95 in combination.

Furthermore, the map company exclusive application data management device 12 obtains the dynamic map data public key 502 (502a), the map company exclusive application data secret key 503, the dynamic map data 1 and the dynamic map data electronic signature 95 from the dynamic map data management device 11, conducts a signature verification of the dynamic map data 1, using the dynamic map data public key 502 (502a) and the dynamic map data electronic signature 95, adds the map company exclusive application data 2 to the dynamic map data 1 which has been confirmed to be authentic by the signature verification, generates a map company exclusive application data electronic signature 114 for conducting an authenticity certification of the dynamic map data 1 to which the map company exclusive application data 2 has been added, using the map company exclusive application data secret key 503, based on the dynamic map data 1 to which the map company exclusive application data 2 has been added and the dynamic map data electronic signature 95, and outputs the dynamic map data 1 to which the map company exclusive application data 2 has been added, the dynamic map data electronic signature 95 and the map company exclusive application data electronic signature 114 in combination.

Furthermore, an automotive company exclusive application data management device 13 obtains the map company exclusive application data public key 504 and the automotive company exclusive application data secret key 505 from the dynamic map data management device 11, obtains the dynamic map data 1 to which the map company exclusive application data 2 has been added, the dynamic map data electronic signature 95 and the map company exclusive application data electronic signature 114 from the map company exclusive application data management device 12, conducts a signature verification of the dynamic map data 1 to which the map company exclusive application data 2 has been added, using the map company exclusive application data public key 504 and the map company exclusive application data electronic signature 114, adds the automotive company exclusive application data 3 to the dynamic map data 1 to which the map company exclusive application data 2 has been added, which has been confirmed to be authentic by the signature verification, generates a map company exclusive application data electronic signature 114 for conducting an authenticity certification of the dynamic map data 1 to which the automotive company exclusive application data 3 and the map company exclusive application data 2 have been added, using the automotive company exclusive application data secret key 505, based on the dynamic map data 1 to which the automotive company exclusive application data 3 and the map company exclusive application data 2 have been added and the map company exclusive application data electronic signature 114, and outputs the dynamic map data 1 to which the automotive company exclusive application data 3 has been added, the map company exclusive application data 2, the dynamic map data electronic signature 95 and the automotive company exclusive application data electronic signature 131 in combination.

By this way, when providing the map information including the dynamic map data 1, the map company exclusive application data 2, the automotive company exclusive application data 3 and the like via a plurality of organizations such as a map company and an automotive company in sequence, the map information management system according to Embodiment 1 prevents data alteration of the map information and conducts the authenticity certification of the map information.

For instance, data generated in the map company exclusive application data management device 12 of a map company is transmitted to the automotive company exclusive application data management device 13 of an automotive company in a state that the dynamic map data electronic signature 95 and the map company exclusive application data electronic signature 114 are attached to the data. The automotive company may use the map information (the dynamic map data 1 and the map company exclusive application data 2) from the map company without any modifications, or may use the map information after mounting the automotive company exclusive application data 3 on it. In a case where the automotive company exclusive application data 3 is mounted, the dynamic map data electronic signature 95, and the map company exclusive application data electronic signature 114 or the automotive company exclusive application data electronic signature 131 are attached, then the security of data mounted is guaranteed. In this way, the data guarded with a security protection by encryption for a purpose of preventing alternations of map information including the dynamic map data 1 can be stored in the automatic driving vehicle or the car navigation device.

EMBODIMENT 2

As with the explanations of FIG. 1, the map information system according to Embodiment 2 of the present invention includes a dynamic map data management device 11 to which various sorts of information is input from an external organization data management device 10, a map company exclusive application data management device 12 which is provided with data from the dynamic map data management device 11, and an automotive company exclusive application data management device 13 which is provided with data from the dynamic map data management device 11 and the map company exclusive application data management device 12. A vehicle 15 is an automatic driving vehicle or a vehicle on which a car navigation device is mounted.

In the map information management system according to Embodiment 2, each of the dynamic map data management device 11, the map company exclusive application data management device 12 and the automotive company exclusive application data management device 13 conducts an encryption or a decryption of data according to a homomorphic encryption or a fully homomorphic encryption. The homomorphic encryption or the fully homomorphic encryption can grant access rights, decrypting rights, and data processing rights. When a decrypting right is owned, a decrypting can be conducted, using an allowed public key. Also, when a data processing right is owned, a calculation of the encrypted data which remains encrypted and additional data can be conducted, using an allowed public key.

Figure 4:
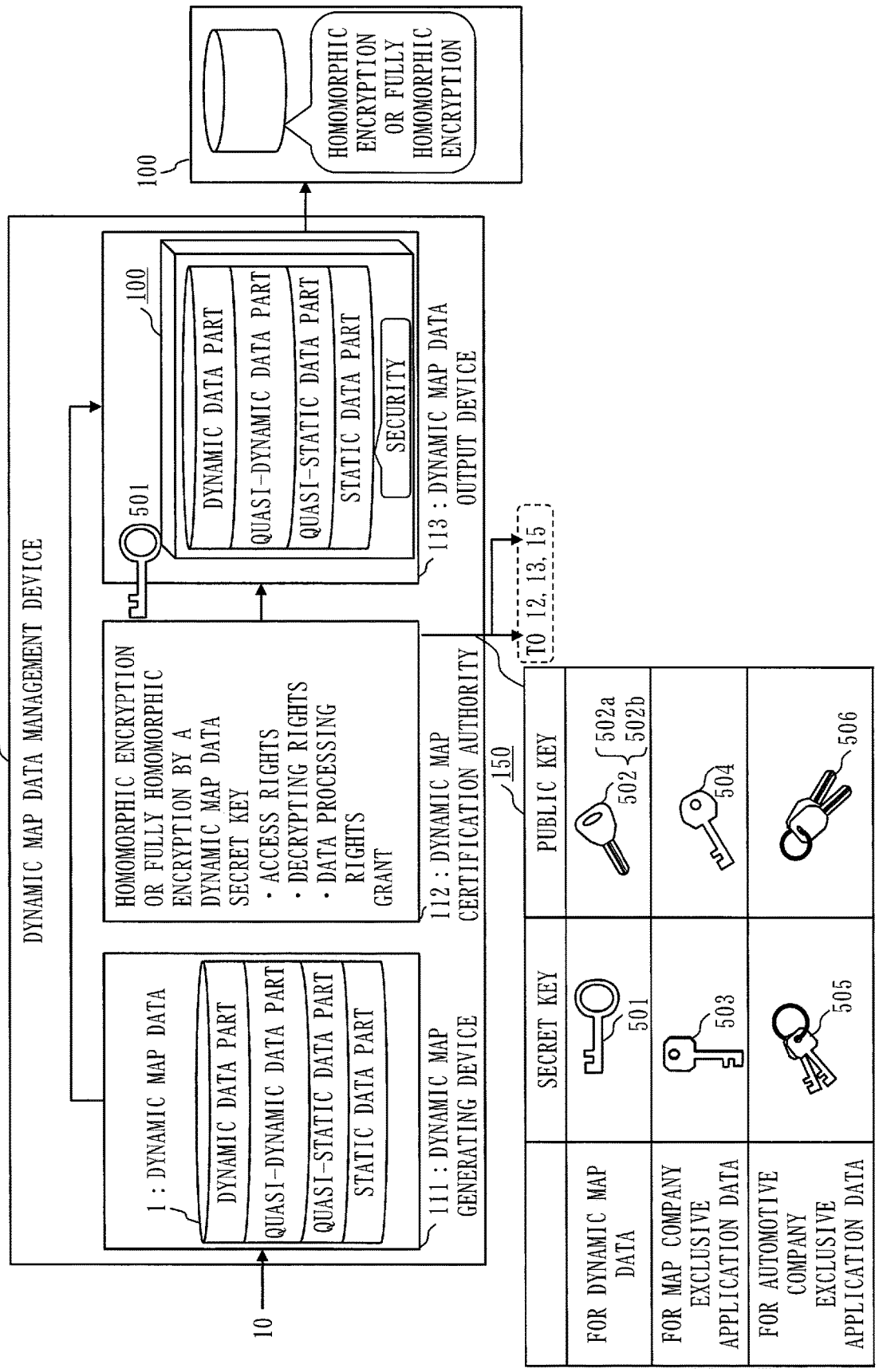
FIG. 4 is a diagram illustrating a configuration of the dynamic map data management device of the map information management system according to Embodiment 2.

FIG. 4 is a diagram illustrating a configuration of the dynamic map data management device 11 of the map information management system according to Embodiment 2. In FIG. 4, the dynamic map data management device 11 includes a dynamic map generating device 111, a dynamic map certification authority 112 and a dynamic map data output device 113. The dynamic map generating device 111 and the dynamic map data output device 113 may be composed of the same server or different servers connected to a network. Also, the dynamic map certification authority 112 is installed in a server set outside of the server which composes of the dynamic map generating device 111 or the dynamic map data output device 113 in the dynamic map data management device 11. That is, in order to secure the strength of security, dynamic map certification authority 112 is preferably operated and managed separately from the dynamic map generating device 111 and the dynamic map data output device 113.

The dynamic map generating device 111 receives various sorts of information from the external organization data management device 10. The dynamic map generating device 111 generates the dynamic map data 1 based on the various sorts of information which are obtained from the external organization data management device 10.

The dynamic map certification authority 112 according to Embodiment 2 generates a plurality of secret keys and a plurality of public keys 150, stores an access right, a decrypting right, a data processing right and renewal dates and the like of each of the generated secret keys and public keys 150, and conducts renewal management. For instance, the dynamic map certification authority 112 generates each of a dynamic map data secret key 501, a dynamic map data public key 502a and a dynamic map data public key 502b, a map company exclusive application data secret key 503, a map company exclusive application data public key 504, an automotive company exclusive application data secret key 505 and an automotive company exclusive application data public key 506 as the plurality of secret keys and the plurality of public keys 150.

The dynamic map data secret key 501 is used for the encryption of data according to the homomorphic encryption or the fully homomorphic encryption. All rights of access rights, decrypting rights and data processing rights of the dynamic map data secret key 501 are granted only to an operator of the dynamic map data output device 113.

Also, the dynamic map data public keys 502a and 502b are used for the decryptions of the encrypted data according to the homomorphic encryptions or the fully homomorphic encryptions using the dynamic map data secret key 501. All rights of access rights, decrypting rights and data processing rights of the dynamic map data public keys 502a and 502b are granted only to the dynamic map data management device 11.

Besides, access rights and decrypting rights using the dynamic map data public key 502a are granted to the map company exclusive application data management device 12.

Further, access rights, decrypting rights and data processing rights only for some type of data using the dynamic map data public key 502b, are granted to the automotive company exclusive application data management device 13.

Here, the some type of data for which the data processing rights are granted to the dynamic map data public key 502b includes, for instance, positions of traffic lights, positions of signs, positions of road signs and the like. Furthermore, other type of data than the some type of data, for which the data processing rights are not granted to the dynamic map data public key 502b includes, for instance, current sign information of traffic lights, legal display contents of signs and road signs, and the like.

Moreover, as the dynamic map data public key 502a corresponding to the dynamic map data secret key 501 used by the map company exclusive application data management device 12 and the dynamic map data public key 502b corresponding to the dynamic map data secret key 501 used by the automotive company exclusive application data management device 13, it is preferable to use different public keys in order to grant different data processing rights. However, the same public key may be used when the same data processing right is granted.

The map company exclusive application data secret key 503 is used for the encryption of data according to the homomorphic encryption or the fully homomorphic encryption. All rights of access rights, decrypting rights and data processing rights of the map company exclusive application data secret key 503 are granted only to an operator of the map company exclusive application data management device 12.

The map company exclusive application data public key 504 is used for the decryption of the encrypted data according to the homomorphic encryption or the fully homomorphic encryption using the map company exclusive application data secret key 503.

Only access rights and decrypting rights to the dynamic map data 1 are granted to the map company exclusive application data management device 12 regarding the map company exclusive application data public key 504.

Furthermore, all rights of access rights, decrypting rights and data processing rights for the map company exclusive application data 2 are granted to the map company exclusive application data management device 12 regarding the map company exclusive application data public key 504.

Additionally, only access rights, decrypting rights and data processing rights for some type of data are granted to the automotive company exclusive application data management device 13 regarding the map company exclusive application data public key 504.

Here, regarding the map company exclusive application data public key 504, the some type of data for which data processing rights to the dynamic map data 1 are granted is, for instance, positions of traffic lights, positions of signs and positions of road signs and the like.

Also, regarding the map company exclusive application data public key 504, other type of data than the some type of data, for which the data processing rights to the dynamic map data 1 is not granted is, for instance, current sign information of traffic lights, legal display contents of signs and road signs, and the like.

Further, regarding the map company exclusive application data public key 504, some type of data for which data processing rights to the map company exclusive application data 2 are granted is, for instance, information on locations of shops, information on locations of commercial buildings and the like.

Furthermore, regarding the map company exclusive application data public key 504, other type of data than the some type of data, for which the data processing rights to the map company exclusive application data 2 is not granted is, for instance, telephone numbers of shops, names of commercial building owners and the like.

Moreover, all rights of access rights, decrypting rights and data processing rights for all types of data may be granted to the automotive company exclusive application data management device 13 regarding the map company exclusive application data public key 504.

Furthermore, the map company exclusive application data public key 504 may be concurrently used as the dynamic map data public key 502b. In this case, type of keys can be decreased equal to the number of the dynamic map data public key 502b.

The automotive company exclusive application data secret key 505 is used for data encryption according to the homomorphic encryption or the fully homomorphic encryption. Regarding the automotive company exclusive application data secret key 505, all rights of access rights, decrypting rights, and data processing rights are granted only to an operator of the automotive company exclusive application data management device 13.

The automotive company exclusive application data public key 506 is used for a decryption of encrypted data according to the homomorphic encryption or the fully homomorphic encryption.

Regarding the automotive company exclusive application data public key 506, all rights of access rights, decrypting rights, data processing rights are granted only to an operator of the automotive company exclusive application data management device 13.

An operator of the vehicle 15 is granted only access rights and decrypting rights to the automotive company exclusive application data public key 506.

The dynamic map certification authority 112 delivers each of the plurality of secret keys generated and the plurality of public keys 150 generated to a corresponding destination among the map company exclusive application data management device 12 and the automotive company exclusive application data management device 13 using encrypted communication via a communication network, while a security is being maintained.

The dynamic map data public key 502a is delivered to, for instance, the map company exclusive application data management device 12, and the dynamic map data public key 502b is delivered to, for instance, the automotive company exclusive application data management device 13.

The map company exclusive application data secret key 503 is solely delivered to, for instance, the map company exclusive application data management device 12.

The map company exclusive application data public key 504 is delivered to, for instance, the automotive company exclusive application data management device 13.

The automotive company exclusive application data secret key 505 is solely delivered to, for instance, the automotive company exclusive application data management device 13.

The automotive company exclusive application data public key 506 is delivered to, for instance, the automotive company exclusive application data management device 13 and the vehicle 15.

Further, the dynamic map certification authority 112 may encrypt the plurality of secret keys and the plurality of public keys 150 and store them in electronic mediums such as a DVD-ROM, a BD-ROM or a USB memory. The electronic mediums such as the DVD-ROM, the BD-ROM or the USB memory are preferably delivered to each of the map company exclusive application data management device 12 and the automotive company exclusive application data management device 13.

The dynamic map data output device 113 encrypts the dynamic map data 1 generated by the dynamic map generating device 111 according to the homomorphic encryption or the fully homomorphic encryption to generate the encrypted data 100, using the dynamic map data secret key 501 which is generated by the dynamic map certification authority 112.

The dynamic map data output device 113 outputs the encrypted data 100 which is the encrypted dynamic map data 1 to each of the map company exclusive application data management device 12 and the automotive company exclusive application data management device 13.

Moreover, the dynamic map data output device 113 may store the encrypted data 100 which is the encrypted dynamic map data 1 in the electronic mediums such as a DVD-ROM, a BD-ROM, or a USB memory, and may deliver the electronic mediums such as the DVD-ROM, the BD-ROM, or the USB memory to each of the map company exclusive application data management device 12 and the automotive company exclusive application data management device 13.

Figure 5:
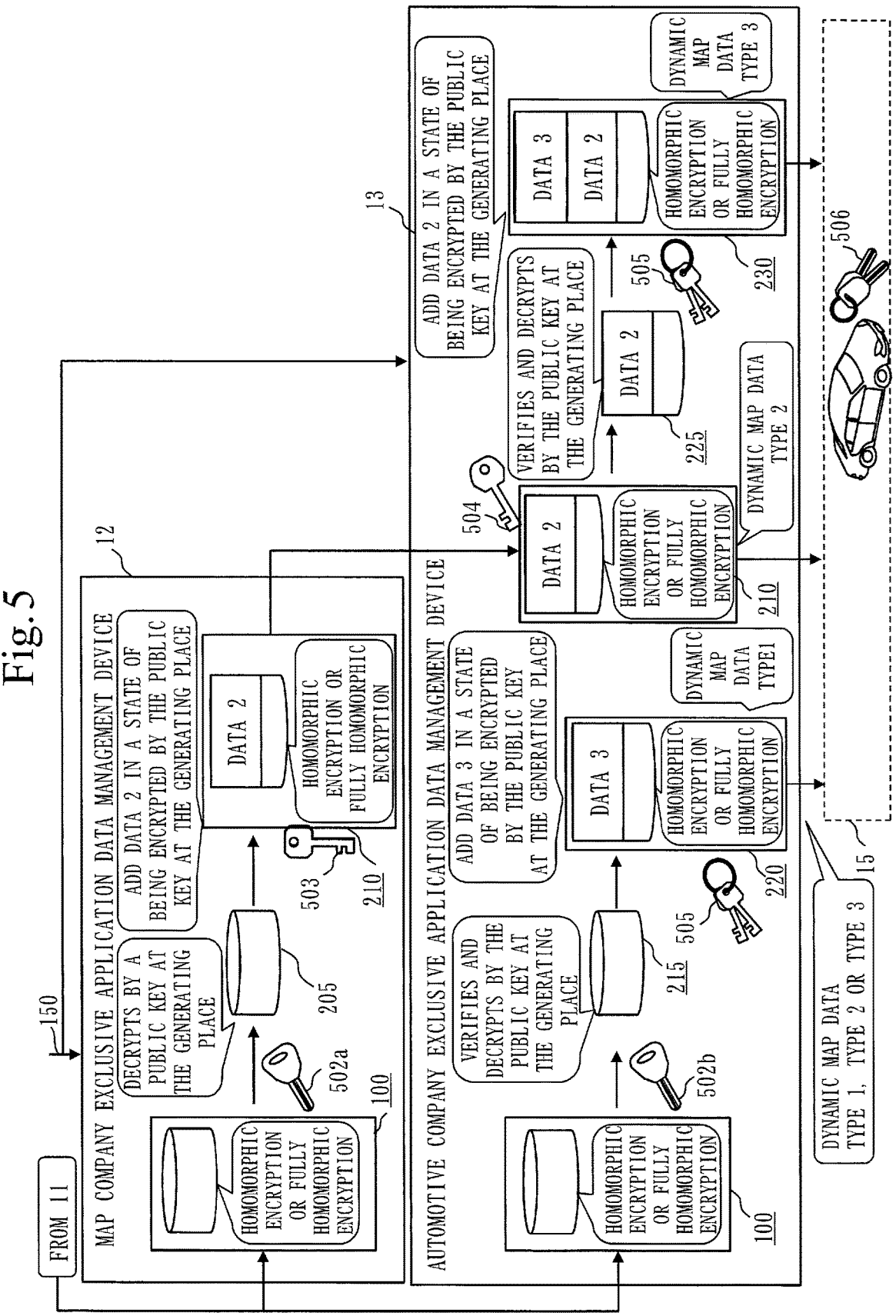
FIG. 5 is a flowchart illustrating a flow of the map company exclusive application data management device and the automotive company exclusive application data management device of the map information management system according to Embodiment 2.

FIG. 5 is a diagram illustrating a data processing flow by the map company exclusive application data management device 12 and the automotive company exclusive application data management device 13 in the map information management system according to Embodiment 2. In FIG. 5, the vehicle 15 is an automatic driving vehicle with a memory device, a car navigation device including a memory device and a map display device, and the like.

In FIG. 5, the map company exclusive application data management device 12 obtains the dynamic map data public key 502a, and the map company exclusive application data secret key 503 from the dynamic map data management device 11 by encrypted communication via the communication network. The automotive company exclusive application data management device 13 obtains the dynamic map data public key 502b, the map company exclusive application data public key 504, and the automotive company exclusive application data secret key 505 from the dynamic map data management device 11 by the encrypted communication via the communication network.

Furthermore, the map company exclusive application data management device 12 and the automotive company exclusive application data management device 13 individually receives the encrypted data 100 from the dynamic map data management device 11 by the encrypted communication via the communication network.

Note that the map company exclusive application data management device 12 and the automotive company exclusive application data management device 13 may receive the encrypted data 100 in a state that the encrypted data 100 is stored in the electronic mediums such as the DVD-ROM, the BD-ROM or the USB memory.

The map company exclusive application data management device 12 is granted the dynamic map data public key 502a, and the access right and the decrypting right to the dynamic map data 1. However, the map company exclusive application data management device 12 is not granted the right to data-process the dynamic map data 1 using the dynamic map data public key 502a.

On the other hand, the automotive company exclusive application data management device 13 is granted the dynamic map data public key 502b, the access right and the decrypting right and the data processing right to some type of data to the dynamic map data 1.

When acquiring the encrypted data 100 from the dynamic map data management device 11, the map company exclusive application data management device 12 generates the dynamic map data 205 which is decrypted dynamic map data 1 based on the encrypted data 100 at the same time as the acquisition, at the predetermined time intervals, or after the predetermined time has lapsed.

At this time, the map company exclusive application data management device 12 decrypts the dynamic map data 1 as the dynamic map data 205 according to the homomorphic encryption or the fully homomorphic encryption using the dynamic map data public key 502a and verifies the authenticity of the dynamic map data 1.

Thereby, the dynamic map data 1 decrypted as the dynamic map data 205 is verified whether it is legitimate (authentic) one received directly or indirectly from a legitimate generator, and if it is legitimate, it can be confirmed to be authentic.

Moreover, since the map company exclusive application data management device 12 is not granted the data processing right with regard to the dynamic map data public key 502a, the map company exclusive application data management device 12 cannot conduct data processing on the dynamic map data 205, whereas the map company exclusive application data management device 12 can browse the dynamic map data 205 to confirm whether it is identical to the dynamic map data 1.

That is, an encryption is provided on the dynamic map data 205 in such a way that data description contents of the dynamic map data 1 can be read but data description contents of the dynamic map data 1 cannot be data-processed.

After conducting an authenticity certification, the map company exclusive application data management device 12 adds the map company exclusive application data 2 to the dynamic map data 205 which is confirmed (guaranteed) to be authentic. The map company exclusive application data management device 12 encrypts data in which the map company exclusive application data 2 is added to the dynamic map data 205 according to the homomorphic encryption or the fully homomorphic encryption to generate the encrypted data 210, using the map company exclusive application data secret key 503. The encrypted data 210 is output to the automotive company exclusive application data management device 13.

Next, when acquiring the encrypted data 100 from the dynamic map data management device 11, the automotive company exclusive application data management device 13 generates the decrypted data 215 which is decrypted dynamic map data 1 based on the encrypted data 100 at the same time as the acquisition, at the predetermined time intervals, or after the predetermined time has lapsed.

At this time, the automotive company exclusive application data management device 13 decrypts the decrypted data 215 from the encrypted data 100 of the dynamic map data 1 according to the homomorphic encryption or the fully homomorphic encryption using the dynamic map data public key 502b and verifies the authenticity of the dynamic map data 1.

Thereby, the dynamic map data 1 decrypted as the dynamic map data 205 is verified whether it is legitimate (authentic) one received directly or indirectly from a legitimate generator, and if it is legitimate, it can be confirmed to be authentic.

Moreover, since the automotive company exclusive application data management device 13 is not granted the data processing rights to all types of data with regard to the dynamic map data public key 502b, the automotive company exclusive application data management device 13 cannot conduct data processing on the decrypted data 215, whereas the automotive company exclusive application data management device 13 can browse the decrypted data 215 to confirm whether it is identical to the dynamic map data 1.

That is, an encryption is provided on the decrypted data 215 in such a way that data description contents of the dynamic map data 1 can be read but data description contents of the dynamic map data 1 cannot be data-processed.

Further, when acquiring the encrypted data 210 from the map company exclusive application data management device 12, the automotive company exclusive application data management device 13 generates decrypted data 225 which is individually decrypted dynamic map data 1 and decrypted map company exclusive application data 2 based on the encrypted data 210 at the same time as the acquisition, at the predetermined time intervals, or after the predetermined time has lapsed.

At this time, the automotive company exclusive application data management device 13 generates the decrypted data 205 which is the dynamic map data 1 and the map company exclusive application data 2 that are decrypted individually from the encrypted data of the dynamic map data 1 and the map company exclusive application data 2 according to the homomorphic encryption or the fully homomorphic encryption using the map company exclusive application data public key 504, and verifies authenticity of each of the dynamic map data 1 and the map company exclusive application data 2.

Thereby, the dynamic map data and the map company exclusive application data decrypted by decrypted data 225 are verified whether they are legitimate (authentic) ones received directly or indirectly from a legitimate generator, and if they are legitimate, they can be confirmed to be authentic.

Since the automotive company exclusive application data management device 13 is not granted the data processing rights to all types of data with regard to the map company exclusive application data public key 504, the automotive company exclusive application data management device 13 can browse each of the dynamic map data 1 and the map company exclusive application data 2 which are decrypted in the decrypted data 225 to confirm whether they are identical to an original dynamic map data 1 generated by the dynamic map data management device 11 and an original map company exclusive application data 2 generated by the map company exclusive application data management device 12. However, the automotive company exclusive application data management device 13 cannot conduct data processing on the dynamic map data 1 and the map company exclusive application data 2 which are decrypted in the decrypted data 225.

That is, an encryption is provided on the decrypted data 225 in such a way that data description contents of the dynamic map data 1 or the map company exclusive application data 2 can be read but data description contents of the dynamic map data 1 or the map company exclusive application data 2 cannot be data-processed, except for data description contents of some type of data.

After conducting an authenticity certification of decrypted data 215, the automotive company exclusive application data management device 13 adds individually the automotive company exclusive application data 3 to the decrypted data 215 which is confirmed (guaranteed) to be authentic. The automotive company exclusive application data management device 13 encrypts data in which the automotive company exclusive application data 3 is added to the decrypted data 215 according to the homomorphic encryption or the fully homomorphic encryption to generate the encrypted data 220, using the automotive company exclusive application data secret key 505. The automotive company exclusive application data management device 13 outputs the generated encrypted data 220 to the vehicle 15. After acquiring the encrypted data 220, the vehicle 15 verifies the authenticity of the dynamic map data 1 and the automotive company exclusive application data 3 and decrypts them, using the automotive company exclusive application data public key 506.

Also, after conducting the authenticity certification of the decrypted data 225, the automotive company exclusive application data management device 13 outputs the encrypted data 210 before decryption, which corresponds to the decrypted data 225 which is confirmed (guaranteed) to be authentic, to the vehicle 15. After acquiring the encrypted data 210, the vehicle 15 verifies the authenticity of the dynamic map data 1 and the map company exclusive application data 2 and decrypts them, using the automotive company exclusive application data public key 506.

Moreover, after conducting an authenticity certification of decrypted data 225, the automotive company exclusive application data management device 13 adds individually the automotive company exclusive application data 3 to the decrypted data 225 which is confirmed (guaranteed) to be authentic. The automotive company exclusive application data management device 13 encrypts data in which the automotive company exclusive application data 3 is added to the decrypted data 225 according to the homomorphic encryption or the fully homomorphic encryption to generate the encrypted data 230, using the automotive company exclusive application data secret key 505. The automotive company exclusive application data management device 13 outputs the generated encrypted data 230 to the vehicle 15. After acquiring the encrypted data 230, the vehicle 15 verifies the authenticity of the dynamic map data 1, the map company exclusive application data 2, the automotive company exclusive application data 3 and decrypts them, using the automotive company exclusive application data public key 506.

Further, the automotive company exclusive application data secret key 505 generating the encrypted data 220 and the automotive company exclusive application data secret key 505 generating the encrypted data 230 may be different keys.

As mentioned above, the map information delivery system according to Embodiment 2 includes the dynamic map data management device 11 which generates the encrypted data 100 based on the pre-generated dynamic map data 1, using the dynamic map data secret key 501 and outputs, the map company exclusive application data management device 12 which obtains the encrypted data 100 from the dynamic map data management device 11, confirms authenticity of the dynamic map data 1 using the pre-received dynamic map data public key 502a corresponding to the dynamic map data secret key 501 and the encrypted data 100 obtained from the dynamic map data management device 11, generates the encrypted data 210 by the pre-received map company exclusive application data secret key 503, based on data in which the map company exclusive application data 2 is added to the dynamic map data 1 which has been confirmed to be authentic, and outputs the encrypted data 210, and the automotive company exclusive application data management device 13 which obtains the encrypted data 210 in which the map company exclusive application data 2 is added to the dynamic map data 1 from the map company exclusive application data management device 12, confirms the authenticity of the data in which the map company exclusive application data 2 is added to the dynamic map data 1, using the pre-received map company exclusive application data public key 504 corresponding to the pre-received map company exclusive application data secret key 503 and the encrypted data 210, and generates the encrypted data 230 to be implemented in a vehicle, by the pre-received automotive company exclusive application data secret key 505, based on data in which the automotive company exclusive application data 3 is further added to the data in which the map company exclusive application data 2 is added to the dynamic map data 1 which has been confirmed to be authentic.

Also, the dynamic map data management device 11 comprises the dynamic map generating device 111 generating the dynamic map data 1, the dynamic map certification authority 112 generating each of the dynamic map data secret key 501 and the dynamic map data public key 502$a$ for decrypting the encrypted data 100 by the dynamic map data secret key 501, the map company exclusive application data secret key 503 and the map company exclusive application data public key 504 for decrypting the encrypted data 210 by the map company exclusive application data secret key 503, and the automotive company exclusive application data secret key 505 and the automotive company exclusive application data public key 506 for decrypting the encrypted data 230 by the automotive company exclusive application data secret key 505, based on a predetermined access right, a predetermined decrypting right and a predetermined data processing right of each of the dynamic map data 1, the map company exclusive application data 2, and the automotive company exclusive application data 3, and distribute each generated secret key and each generated public key, and the dynamic map data output device 113 generating the encrypted data 100 which is obtained by the homomorphic encryption or the fully homomorphic encryption of the dynamic map data 1 using the generated dynamic map data secret key 501, and outputting. The dynamic map certification authority 112 is preferably operated under a different management from those of the dynamic map generating device 111 and the dynamic map data output device 113.

Also, the map company exclusive application data management device 12 obtaining the dynamic map data public key 502$a$, the map company exclusive application data secret key 503 and the encrypted data 100 from the dynamic map data management device 11, decrypting the dynamic map data 1 from the encrypted data 100, using the dynamic map data public key 502$a$, and verifying authenticity of data, adding the map company exclusive application data 2 to the obtained dynamic map data 1, generating the encrypted data 210 which is obtained by the homomorphic encryption or the fully homomorphic encryption of the dynamic map data 1 and the map company exclusive application data 2 using the obtained map company exclusive application data secret key 503, and outputting.

Also, the automotive company exclusive application data management device 13 obtains the map company exclusive application data public key 504 and the automotive company exclusive application data secret key 505 from the dynamic map data management device 11, obtains the encrypted data 210 from the map company exclusive application data management device 12, decrypts the dynamic map data 1 and the map company exclusive application data 2 from the encrypted data 210, using the map company exclusive application data public key 504, verifies authenticity of data, adds the automotive company exclusive application data 3 to the obtained dynamic map data 1 and the map company exclusive application data 2, generates the encrypted data 230 that is encrypted automotive company exclusive application data which is obtained by the homomorphic encryption or the fully homomorphic encryption of the dynamic map data 1, the map company exclusive application data 2 and the automotive company exclusive application data 3 using the obtained automotive company exclusive application data secret key 505, and outputs.

By this way, when providing the map information including the dynamic map data 1, the map company exclusive application data 2, the automotive company exclusive application data 3 and the like via a plurality of organizations such as a map company and an automotive company in sequence, the map information management system according to Embodiment 2 prevents data alteration of the map information and confirms authenticity of the map information.

Also, in the map information management system according to Embodiment 2, the encrypted dynamic map data 1 with the homomorphic encryption or the fully homomorphic encryption is transmitted, for example, to the map company exclusive application data management device 12 owned by the map company or the automotive company exclusive application data management device 13 owned by the automotive company. The map company exclusive application data management device 12 or the automotive company exclusive application data management device 13 receives the encrypted dynamic map data 1 and, can decrypted it with the public key owned by each of them when having the decryption right. Further, when having the data processing right, each of them can add the map company exclusive application data 2 or the automotive company exclusive application data 3 to the dynamic map data while it remains encrypted, using the public key owned by each of them. The map company exclusive application data management device 12 transmits the security protected encrypted data to the automotive company exclusive application data management device 13. When the automotive company exclusive application data management device 13 adds the automotive company exclusive application data 3, it can verify and decrypt using the owned public key in a case of having the decrypting right, and adds the automotive company exclusive application data 3 while the encrypted data remains encrypted using the owned public key in a case of having the data processing right. Thereby, the security protected data can be stored in the automatic driving vehicle or the vehicle 15 such as a vehicle on which a car navigation is mounted, so as to prevent data alteration of map information including the dynamic map data 1.

REFERENCE SIGNS LIST

1, 205: dynamic map data; 2: map company exclusive application data; 3: automotive company exclusive application data; 10: external organization data management device; 11: dynamic map data management device; 12: map company exclusive application data management device; 13: automotive company exclusive application data management device; 15: vehicle; 95: dynamic map data electronic signature; 100: encrypted data; 105: data; 110: encrypted data; 111: dynamic map generating device; 112: dynamic map certification authority; 113: dynamic map data output device; 114: map company exclusive application data electronic signature; 115, 125: combination data; 120: encrypted data; 121, 131: automotive company exclusive application data electronic signature; 130: encrypted data; 150: key; 210: encrypted data; 215, 225: decrypted data;

220: encrypted data; 230: encrypted data; 501: dynamic map data secret key; 502, 502a, 502b: dynamic map data public key; 503: map company exclusive application data secret key; 504: map company exclusive application data public key; 505: automotive company exclusive application data secret key; 506: automotive company exclusive application data public key

The invention claimed is:

1. A map information management system comprising:
a map information management device including processing circuitry configured to generate encrypted data based on map information, using a map information secret key, and output the encrypted data;
a map company exclusive application data management device including processing circuitry configured to obtain the encrypted data from the map information management device, confirm authenticity of the map information, using a map information public key corresponding to the map information secret key and the encrypted data obtained from the map information management device, generate encrypted data by a map company exclusive application data secret key, based on data which is obtained by adding map company exclusive application data to the map information which has been confirmed to be authentic, and output the encrypted data, the map company exclusive application data including information on at least one of shops, architectures, public facilities, and commercial facilities which exist adjacent to roads that are displayed in the map information when the map information is used in a vehicle navigation device.

2. The map information management system according to claim 1, further comprising:
an automotive data management device including processing circuitry configured to obtain the encrypted data which is obtained by an encryption of the data which is obtained by adding the map company exclusive application data to the map information from the map company exclusive application data management device, confirm authenticity of the data which is obtained by adding the map company exclusive application data to the map information, using a map company exclusive application data public key corresponding to the map company exclusive application data secret key and the encrypted data obtained from the map company exclusive application data management device, generate encrypted data by an automotive company exclusive application data secret key, based on data which is further obtained by adding automotive company exclusive application data to the data which is obtained by adding the map company exclusive application data to the map information which has been confirmed to be authentic, and output the encrypted data.

3. A map information management system comprising:
a map information management device including:
a map information generating device including processing circuitry configured to generate map information; and
a map information output device including processing circuitry configured to generate a map information electronic signature for conducting an authenticity certification of the map information, using a map information secret key, based on the map information, and output the map information and the map information electronic signature in combination,
a map company exclusive application data management device including processing circuitry configured to obtain the map information and the map information electronic signature from the map information management device, conduct a signature verification of the map information, using a map information public key corresponding to the map information secret key and the map information electronic signature, add map company exclusive application data to the map information which has been confirmed to be authentic by the signature verification, generate a map company exclusive application data electronic signature for conducting an authenticity certification of the map information to which the map company exclusive application data has been added, using a map company exclusive application data secret key, based on the map information to which the map company exclusive application data has been added and the map information electronic signature, and output the map information to which the map company exclusive application data has been added, the map information electronic signature and the map company exclusive application data electronic signature in combination.

4. The map information management system according to claim 3, further comprising:
an automotive data management device including processing circuitry configured to obtain the map information to which the map company exclusive application data has been added, the map information electronic signature and the map company exclusive application data electronic signature from the map company exclusive application data management device, conduct a signature verification of the map information to which the map company exclusive application data has been added, using a map company exclusive application data public key corresponding to the map company exclusive application data secret key and the map company exclusive application data electronic signature, add automotive company exclusive application data to the map information to which the map company exclusive application data has been added, which has been confirmed to be authentic by the signature verification, generate an automotive company exclusive application data electronic signature for conducting an authenticity certification of the map information to which the automotive company exclusive application data and the map company exclusive application data have been added, using the automotive company exclusive application data secret key, based on the map information to which the automotive company exclusive application data and the map company exclusive application data have been added and the map company exclusive application data electronic signature, and output the map information to which the automotive company exclusive application data has been added, the map company exclusive application data, the map information electronic signature and the automotive company exclusive application data electronic signature in combination.

5. The map information management system according to claim 4,
wherein the map information management device includes a map information certification authority to generate each of the map information secret key and the map information public key for a signature verification of an electronic signature by the map information secret key, the map company exclusive application data secret key and the map company exclusive application data public key for a signature verification of an electronic signature by the map company exclusive application data secret key, and the automotive company exclusive application data secret key and an automotive company exclusive application data public key for a signature verification of an electronic signature by the automotive company exclusive application data secret key, and distribute each generated secret key and each generated public key.

6. A map information management system comprising:
a map information management device including:
  a map information generating device including processing circuitry configured to generate map information; and
  a map information output device including processing circuitry configured to generate encrypted map information which is obtained by a homomorphic encryption or a fully homomorphic encryption of the map information using a map information secret key, and output the encrypted map information,
a map company exclusive application data management device including processing circuitry configured to obtain the encrypted map information from the map information management device, decrypt the encrypted map information to obtain the map information, using a map information public key corresponding to the map information secret key, verify authenticity of the map information, add map company exclusive application data to the obtained map information, generate encrypted map company exclusive application data which is obtained by the homomorphic encryption or the fully homomorphic encryption of the map information and the map company exclusive application data using a map company exclusive application data secret key, and output the encrypted map company exclusive application data.

7. The map information management system according to claim 6, further comprising:
  an automotive data management device including processing circuitry configured to obtain the encrypted map company exclusive application data from the map company exclusive application data management device, decrypt the encrypted map company exclusive application data to obtain the map information and the map company exclusive application data, using a map company exclusive application data public key corresponding to the map company exclusive application data secret key, verify authenticity of the map information and the map company exclusive application data, add automotive company exclusive application data to the map information and the map company exclusive application data, generate encrypted automotive company exclusive application data which is obtained by the homomorphic encryption or the fully homomorphic encryption of the map information, the map company exclusive application data and the automotive company exclusive application data using an automotive company exclusive application data secret key, and output the encrypted automotive company exclusive application data.

8. The map information management system according to claim 7,
wherein the map information management device includes a map information certification authority to generate each of the map information secret key and the map information public key for decrypting encrypted data by the map information secret key, the map company exclusive application data secret key and the map company exclusive application data public key for decrypting encrypted data by the map company exclusive application data secret key, and the automotive company exclusive application data secret key and an automotive company exclusive public key for decrypting encrypted data by the automotive company exclusive application data secret key, based on a predetermined access right, a predetermined decrypting right and a predetermined data processing right of each of the map information, the map company exclusive application data and the automotive company exclusive application data, and distribute each generated secret key and each generated public key.

9. A map company exclusive application data management device comprising:
processing circuitry configured to
  obtain encrypted data from a map information management device being adapted to generate the encrypted data based on map information using a map information secret key,
  confirm authenticity of the map information, using a map information public key corresponding to the map information secret key and the encrypted data obtained from the map information management device,
  generate encrypted data by a map company exclusive application data secret key, based on data which is obtained by adding map company exclusive application data to the map information which has been confirmed to be authentic, the map company exclusive application data including information on at least one of shops, architectures, public facilities, and commercial facilities which exist adjacent to roads that are displayed in the map information when the map information is used in a vehicle navigation device, and
  output the encrypted data.

10. A map information management device comprising:
a map information generating device including processing circuitry configured to generate map information; and
a map information output device including processing circuitry configured to generate a map information electronic signature for conducting an authenticity certification of the map information, using a map information secret key, based on the map information,
wherein the map information management device includes a map information certification authority to generate each of the map information secret key and a map information public key for a signature verification of an electronic signature by the map information secret key, and a map company exclusive application data secret key and a map company exclusive application data public key for a signature verification of an electronic signature by the map company exclusive application data secret key, and distribute each generated secret key and each generated public key.

11. A map company exclusive application data management device comprising:
processing circuitry configured to
  obtain a map information and a map information electronic signature from a map information management device being adapted to generate the map information electronic signature for conducting an authenticity certification of the map information, using a map information secret key;

conduct a signature verification of the map information, using a map information public key corresponding to the map information secret key and the map information electronic signature;

add map company exclusive application data to the map information which has been confirmed to be authentic by the signature verification;

generate a map company exclusive application data electronic signature for conducting an authenticity certification of the map information to which the map company exclusive application data has been added, using a map company exclusive application data secret key, based on the map information to which the map company exclusive application data has been added and the map information electronic signature; and output the map information to which the map company exclusive application data has been added, the map information electronic signature and the map company exclusive application data electronic signature in combination.

12. A map information management device comprising:
a map information generating device including processing circuitry configured to generate map information, and
a map information output device including processing circuitry configured to generate encrypted map information which is obtained by a homomorphic encryption or a fully homomorphic encryption of the map information using a map information secret key,
wherein the map information management device includes a map information certification authority to generate each of the map information secret key and a map information public key for decrypting encrypted data by the map information secret key, and a map company exclusive application data secret key and a map company exclusive application data public key for decrypting encrypted data by the map company exclusive application data secret key, based on a predetermined access right, a predetermined decrypting right and a predetermined data processing right of each of the map information and the map company exclusive application data, and distribute each generated secret key and each generated public key.

13. A map company exclusive application data management device comprising:
processing circuitry configured to
obtain encrypted map information from a map information management device being adapted to generate the encrypted map information which is obtained by a homomorphic encryption or a fully homomorphic encryption of map information using a map information secret key;
decrypt the encrypted map information to obtain the map information, using a map information public key corresponding to the map information secret key;
verify authenticity of the map information, adds map company exclusive application data to the obtained map information;
generate encrypted map company exclusive application data which is obtained by the homomorphic encryption or the fully homomorphic encryption of the map information and the map company exclusive application data using a map company exclusive application data secret key; and
output the encrypted map company exclusive application data.

* * * * *